(12) United States Patent
Kim et al.

(10) Patent No.: US 8,878,842 B2
(45) Date of Patent: Nov. 4, 2014

(54) STEREOSCOPIC IMAGE DISPLAY DEVICE AND METHOD FOR DRIVING THE SAME

(75) Inventors: Suhyung Kim, Goyang-si (KR);
Seonggyun Kim, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 72 days.

(21) Appl. No.: 13/480,054

(22) Filed: May 24, 2012

(65) Prior Publication Data
US 2013/0027390 A1  Jan. 31, 2013

(30) Foreign Application Priority Data

Jul. 27, 2011 (KR) .................. 10-2011-0074476

(51) Int. Cl.
| | |
|---|---|
| G06T 15/00 | (2011.01) |
| G06T 15/20 | (2011.01) |
| H04N 13/00 | (2006.01) |
| H04N 13/04 | (2006.01) |
| G09G 3/00 | (2006.01) |
| G06T 7/00 | (2006.01) |
| H04N 13/02 | (2006.01) |
| G09G 5/00 | (2006.01) |

(52) U.S. Cl.
CPC .............. *G09G 3/003* (2013.01); *G06T 7/0075* (2013.01); *G06T 15/20* (2013.01); *H04N 13/0022* (2013.01); *H04N 13/026* (2013.01); *H04N 13/0271* (2013.01); *H04N 13/0497* (2013.01); *G09G 5/003* (2013.01); *G06T 2207/10021* (2013.01)
USPC ................ 345/419; 345/427; 348/42; 348/51

(58) Field of Classification Search
USPC ....................................................... 345/419
See application file for complete search history.

(56) References Cited

U.S. PATENT DOCUMENTS 6,496,598 B1 * 12/2002 Harman ................... 382/154
6,798,406 B1 * 9/2004 Jones et al. .............. 345/419
(Continued)

FOREIGN PATENT DOCUMENTS

| CN | 1153362 A | 7/1997 |
|---|---|---|
| CN | 1956554 A | 5/2007 |
| CN | 102081911 A | 6/2011 |

OTHER PUBLICATIONS

Hodges, "Tutorial: Time-Multiplexed Stereoscopic Computer Graphics", IEEE Computer Graphics and Applications, vol. 12, Issue 2, Mar. 1992, pp. 20-30.*

(Continued)

*Primary Examiner* — Ulka Chauhan
*Assistant Examiner* — Roberta D Prendergast
(74) *Attorney, Agent, or Firm* — Brinks Gilson & Lione

(57) ABSTRACT

A stereoscopic image display device and method for driving the same are disclosed. The stereoscopic image display device comprises: a display panel including data lines and gate lines; an image converter that calculates disparity values based on depth values of the depth map extracting from 2D image data, calculates gain disparities by multiplying each of the disparity values by a predetermined gain value, generates left-eye image data and right-eye image data by shifting the 2D image data according to each of the gain disparities, and converts the left-eye image data and the right-eye image data into the 3D image data according to a 3D format; a data driver that converts the 3D image data to data voltage and supplies data voltage to the data lines; and a gate driver that sequentially supplies gate pulses to the gate lines.

8 Claims, 8 Drawing Sheets

(56) References Cited

U.S. PATENT DOCUMENTS

| | | | |
|---|---|---|---|
| 7,916,111 B2* | 3/2011 | Kim et al. | 345/99 |
| 8,111,906 B2* | 2/2012 | Song et al. | 382/154 |
| 8,228,327 B2* | 7/2012 | Hendrickson et al. | 345/420 |
| 8,537,176 B2* | 9/2013 | Ko et al. | 345/596 |
| 2001/0043178 A1* | 11/2001 | Okuzono et al. | 345/87 |
| 2003/0179198 A1* | 9/2003 | Uchiyama | 345/427 |
| 2005/0089212 A1* | 4/2005 | Mashitani et al. | 382/154 |
| 2006/0153289 A1* | 7/2006 | Choi et al. | 375/240.01 |
| 2007/0003134 A1* | 1/2007 | Song et al. | 382/154 |
| 2007/0052794 A1* | 3/2007 | Ha et al. | 348/42 |
| 2008/0031327 A1* | 2/2008 | Wang et al. | 375/240.12 |
| 2008/0122813 A1* | 5/2008 | Kim et al. | 345/204 |
| 2009/0052027 A1* | 2/2009 | Yamada et al. | 359/463 |
| 2009/0219283 A1* | 9/2009 | Hendrickson et al. | 345/420 |
| 2010/0033554 A1* | 2/2010 | Kobayashi | 348/43 |
| 2010/0033634 A1* | 2/2010 | Kim et al. | 348/699 |
| 2010/0289877 A1* | 11/2010 | Lanfranchi et al. | 348/46 |
| 2011/0032341 A1* | 2/2011 | Ignatov et al. | 348/51 |
| 2011/0074770 A1* | 3/2011 | Robinson et al. | 345/419 |
| 2011/0096071 A1* | 4/2011 | Okamoto et al. | 345/419 |
| 2011/0109720 A1* | 5/2011 | Smolic et al. | 348/43 |
| 2011/0142309 A1* | 6/2011 | Zhang et al. | 382/128 |
| 2012/0056990 A1* | 3/2012 | Yoshie | 348/46 |
| 2012/0146995 A1* | 6/2012 | Lee et al. | 345/419 |

OTHER PUBLICATIONS

Office Action issued in corresponding Chinese Patent Application No. 201210166773.8, mailed Apr. 30, 2014, 13 pages.

\* cited by examiner

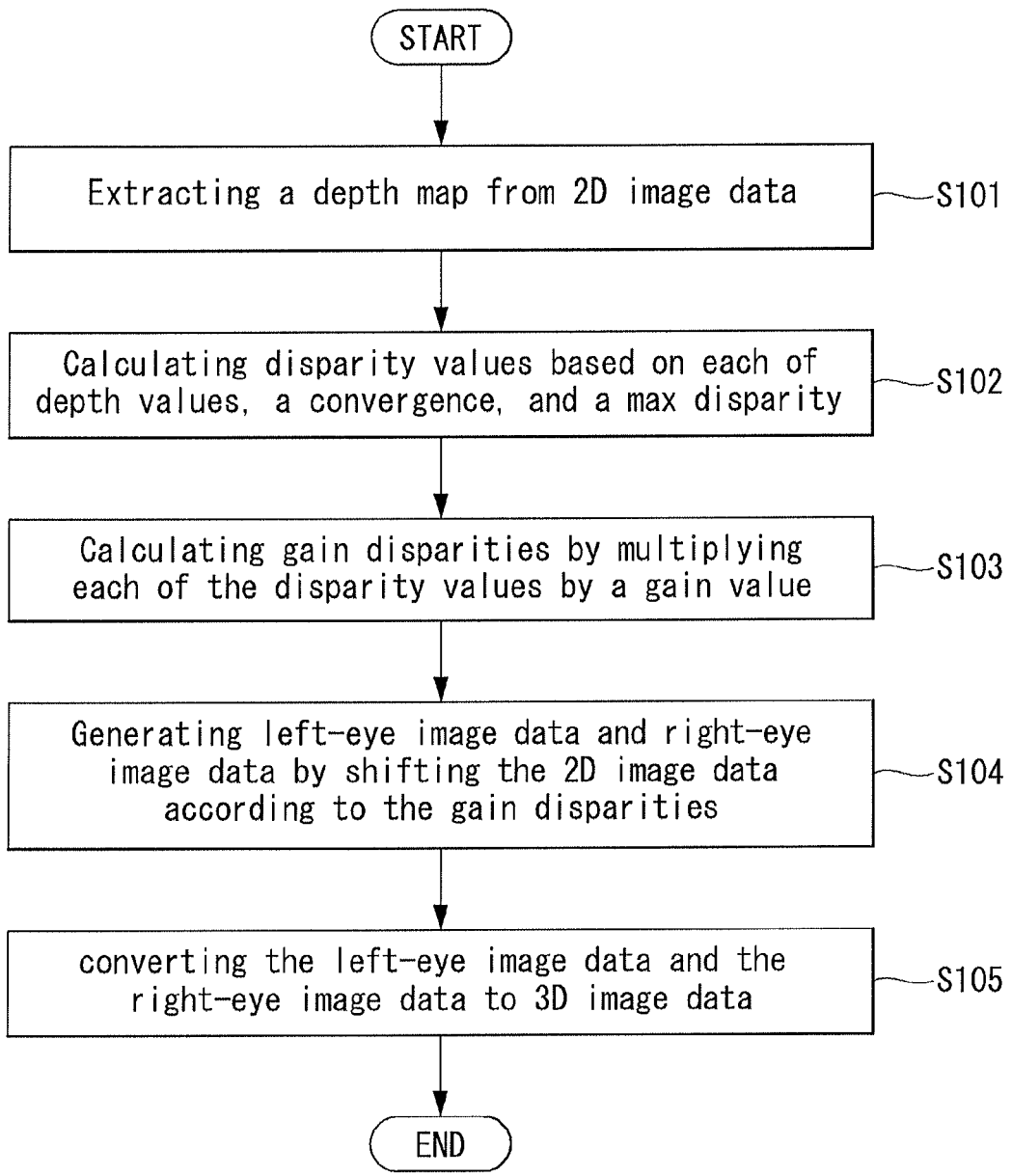

STEREOSCOPIC IMAGE DISPLAY DEVICE AND METHOD FOR DRIVING THE SAME

This application claims the priority and the benefit under 35 U.S.C. §119(a) on Patent Application No. 10-2011-0074476 filed in Republic of Korea on Jul. 27, 2011, the entire contents of which are hereby incorporated by reference.

BACKGROUND

1. Field of the Invention

Embodiments of the disclosure relate to a stereoscopic image display device, which displays 3D image by converting 2D image data to 3D image data and a method for driving the same.

2. Discussion of the Related Art

A technique implementing a stereoscopic image display device is classified into a stereoscopic technique or an autostereoscopic technique. The stereoscopic technique, which uses a binocular parallax image between left and right eyes of a viewer, includes a glass method and a non-glass method. The glass method is classified into a pattern retarder method and a shutter glass method. In the pattern retarder method, it is possible to implement a stereoscopic image by using polarization glasses after displaying the binocular parallax image on a direct view-based display device or a projector by changing polarization direction. In the shutter glass method, it is possible to implement a stereoscopic image by using liquid crystal shutter glasses after displaying the binocular parallax image on a direct view-based display device or a projector in a time division manner. In the non-glass method, it is possible to implement a stereoscopic image by using an optical plate such as a parallax barrier or a lenticular lens for separating an optical axis of the binocular parallax image.

The stereoscopic image display device receives 3D image data in order to implement a 3D image. Each of the 3D image data includes left-eye image data and right-eye image data. The stereoscopic image display device displays 3D image by converting the left-eye image data and the right-eye image data according to a 3D format such as the pattern retarder method, the shutter glass method or the non-glass method.

Also, the stereoscopic image display device can implement 3D image when 2D image data is input thereto. In this case, the stereoscopic image display device generates the left-eye data and the right-eye data from the 2D image data by using an algorithm known in the related art. And then, the stereoscopic image display device displays 3D image by converting the left-eye data and the right-eye data generated from the 2D image data according to the 3D format.

FIGS. 1 and 2 are 3D image implemented by a stereoscopic image display device converting 2D image data to left-eye data and right-eye data by using an algorithm known in the related art. Referring to FIG. 1, image distortion occurs in both sides of the 3D image because one side of the left-eye image data is lost and the other side of the right-eye image data is lost when the left-eye data and the right-eye data are generated from the 2D image data.

Referring to FIG. 2, a method converting the lost left-eye image data and the lost right-eye image data to black data is proposed in order to prevent image distortion shown in FIG. 1. However, in this case, there is a problem that the both sides of the 3D image are lost when the stereoscopic image display device generates the left-eye data and the right-eye data from the 2D image data with this method.

BRIEF SUMMARY

A display panel including data lines, scan lines, and a plurality of pixels formed in cell areas; an image converter that calculates disparity values based on depth values of the depth map extracting from 2D image data, calculates gain disparities by multiplying each of the disparity values by a predetermined gain value, generates left-eye image data and right-eye image data by shifting the 2D image data according to each of the gain disparities, and converts the left-eye image data and the right-eye image data into the 3D image data according to a 3D format; a data driver that converts the 3D image data to data voltage and supplies data voltage to the data lines; and a gate driver that sequentially supplies gate pulses synchronized with the data voltage to the gate lines.

A method for driving a stereoscopic image display device including a display panel including data lines, scan lines, and a plurality of pixels formed in cell areas comprising: (a) extracting a depth map from 2D image data, calculating disparity values based on depth values of the depth map, calculating gain disparities by multiplying each of the disparity values by a predetermined gain value, generating left-eye image data and right-eye image data by shifting the 2D image data according to each of the gain disparities, and converting the left-eye image data and the right-eye image data into the 3D image data according to a 3D format; (b) converting the 3D image data to the data voltage and supplying data voltage to the data lines; and (c) sequentially supplying gate pulses synchronized with the data voltage to the gate lines.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

FIG. 5 is a flow chart illustrating an image conversion method of an image converter.

DETAILED DESCRIPTION OF THE DRAWINGS AND THE PRESENTLY PREFERRED EMBODIMENTS

Figure 1:
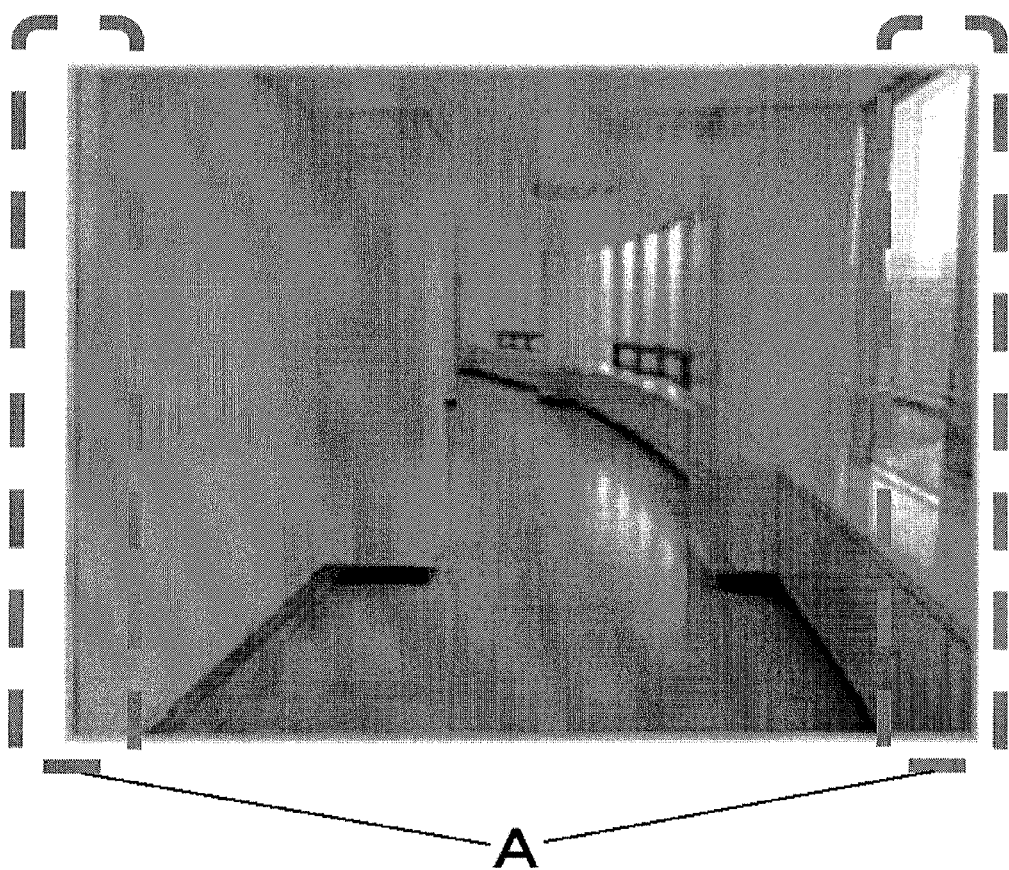
FIGS. 1 and 2 are a 3D image implemented by a stereoscopic image display device converting 2D image data to 3D image data by using an algorithm known in the related art.
Figure 2:
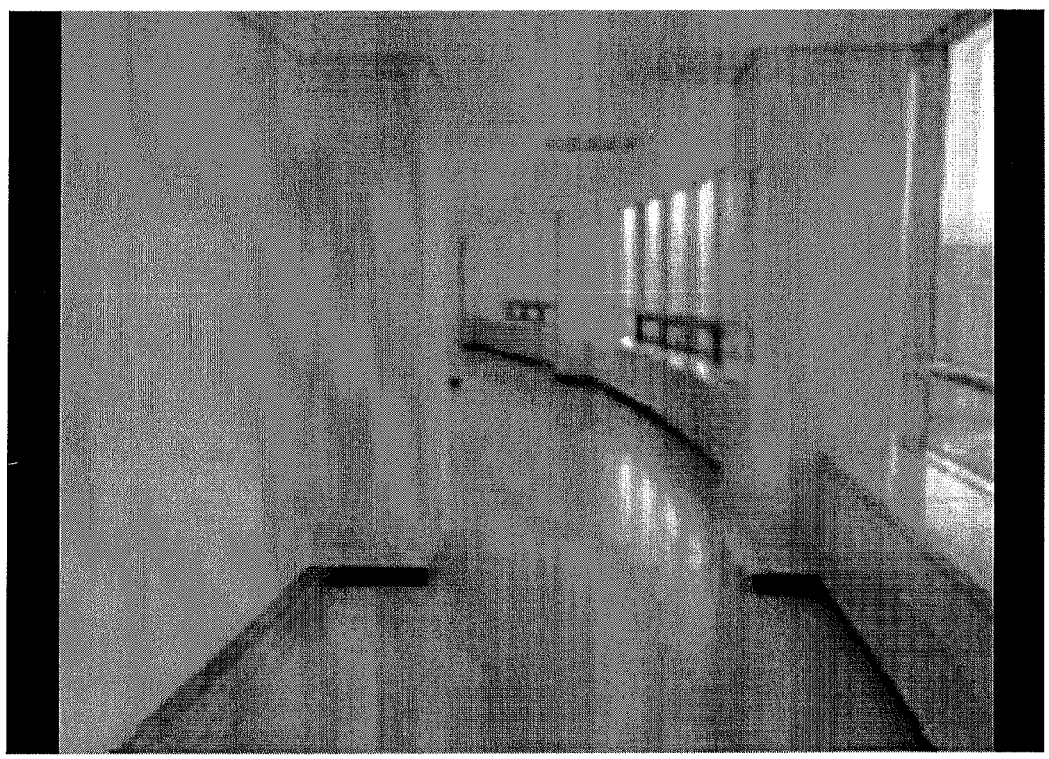
Figure 3:
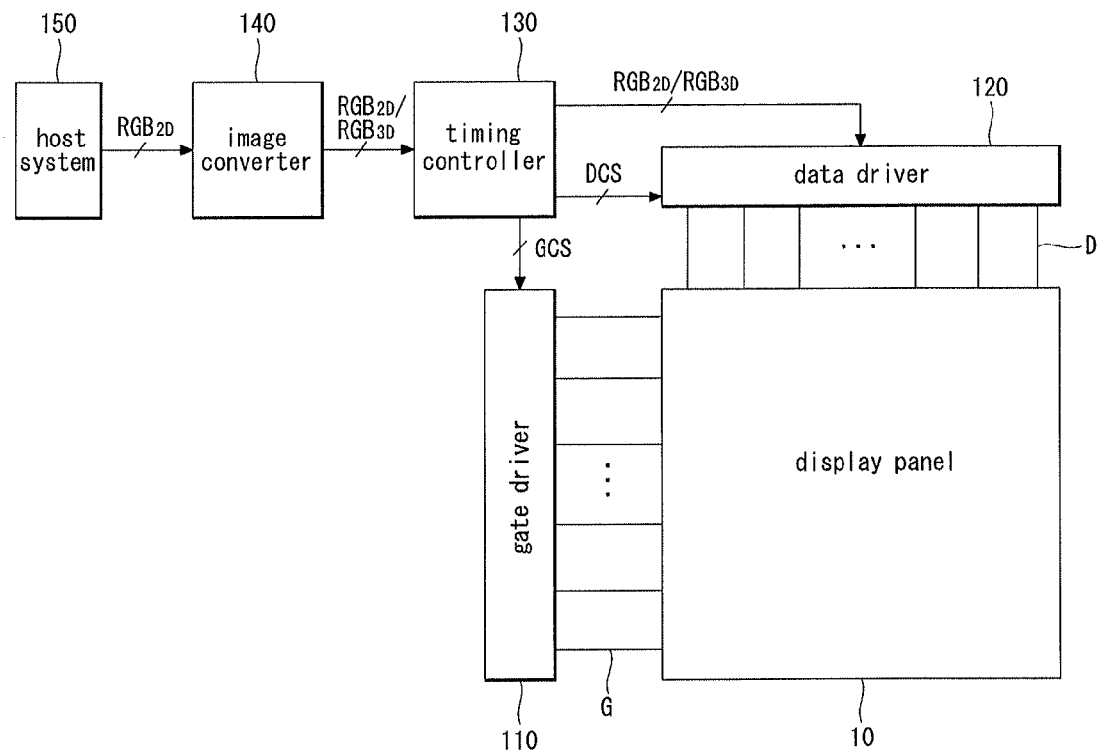
FIG. 3 is a block diagram schematically illustrating a stereoscopic image display device according to an exemplary embodiment of the invention.

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted. Names of the respective elements used in the following explanations are selected only for convenience of writing the specification and may be thus different from those in actual products FIG. 3 is a block diagram schematically illustrating a stereoscopic image display device according to an exemplary embodiment of the invention. The stereoscopic image display device may be implemented as a flat panel display such as a liquid crystal display (LCD), a field emission display (FED), a plasma display panel (PDP) display, and an organic light emitting diode (OLED) display. In the following description, the liquid crystal display is described as an example of the stereoscopic image display device. But, this invention is not limited thereto. Other kinds of flat panel display such as FED, PDP, and OLED may be used. Also, the stereoscopic image display device may be implemented by a non-glass method or a glass method such as a shutter glass method, a pattern retarder method, and active retarder method.

Referring to FIG. 3, the stereoscopic image display device according to the embodiment of the invention includes a display panel 10, a gate driver 110, a data driver 120, a timing controller 130, an image converter 140, a host system 150, and the like. The display panel 10 includes a thin film transistor (TFT) substrate and a color filter substrate. A liquid crystal layer is formed between the TFT substrate and the color filter substrate. Data lines D and gate lines (or scan lines) G crossing over the data lines D are formed on TFT substrate. Pixels are arranged in a matrix form in cell area defined by the data lines D and the gate lines G. A TFT formed at each of crossings of the data lines D and the gate lines G transfers a data voltage supplied via the data line D to a pixel electrode of the liquid crystal cell in response to a gate pulse received through the gate line G. A common voltage is supplied to a common electrode. Each of pixels is driven by an electric field between the pixel electrode and the common electrode.

A color filter array including a black matrix, a color filter, and so on is formed on the color filter substrate. The common electrode is formed on the color filter substrate in a vertical electric field driving manner such as a twisted nematic (TN) mode and a vertical alignment (VA) mode. The common electrode is formed on the TFT substrate along with the pixel electrode in a horizontal electric field driving manner such as an in-plane switching (IPS) mode and a fringe field switching (FFS) mode. The display panel 10 may be implemented in any liquid crystal mode such as the TN, VA, IPS, and FFS modes.

An upper polarizing plate (not shown) is attached to the color filter substrate and a lower polarizing plate (not shown) is attached to the TFT substrate. A light transmission axis of the upper polarizing plate is perpendicular to a light transmission axis of the lower polarizing plate. Alignment layers (not shown) for setting pre-tilt angles of liquid crystals are respectively formed on the TFT substrate and the color filter substrate. A spacer (not shown) is formed between the TFT substrate and the color filter substrate to provide a cell gap of the liquid crystal layer.

The display panel 10 may be implemented as a backlit liquid crystal panel modulating light from a backlight unit. The backlight unit includes a plurality of light sources, a light guide plate (or a diffusion plate), a plurality of optical sheets, and the like. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The backlight unit driver generates a driving current for turning on the light sources of the backlight unit. The backlight unit driver switches on or off the driving current supplied to the light sources under the control of a backlight controller. The backlight controller may be included in the timing controller 130.

The data driver 120 includes a plurality of source driver integrated circuits (ICs). The source driver ICs convert 2D/3D image data RGB2D/RGB3D received from the timing controller 130 into positive or negative polarity gamma compensation voltage and generate positive or negative polarity analog data voltage. The source driver ICs supply the positive and negative analog data voltages to the data lines D of the display panel 10.

The gate driver 110 sequentially supplies a gate pulse synchronized with the data voltage to the gate lines G of the display panel 10 under the control of the timing controller 130. The gate driver 110 includes a plurality of gate driver ICs. Each of the gate driver ICs includes a shift register, a level shifter for converting an output signal of the shift register into a signal having a swing width suitable for a TFT drive of the liquid crystal cell, an output buffer, and the like.

The timing controller 130 generates a gate control signal GCS for controlling the gate driver 110 and a data control signal DCS for controlling the data driver 120 based on the 2D/3D image data RGB2D/RGB3D and timing signals. The timing signals include a vertical synchronization signal, a horizontal synchronization signal, a data enable signal, a dot clock, etc.

The gate control signal GCS includes a gate start pulse, a gate shift clock, a gate output enable signal, and the like. The gate start pulse controls a timing of a first gate pulse. The gate shift clock shifts the gate start pulse GSP. The gate output enable signal controls an output timing of the gate driver 110

The data control signal DCS includes a source start pulse, a source sampling clock, a polarity control signal, a source output enable signal, and the like. The source start pulse controls a data sampling start time point of the data driver 120. The source sampling clock controls a sampling operation of the data driver 120 based on a rising or falling edge thereof. The polarity control signal inverts a polarity of the data voltage output from the data driver 120 for each L horizontal period, where L is a natural number. The source output enable controls an output timing of the data driver 120.

The host system 150 supplies the 2D/3D image data RGB2D/RGB3D to the image converter 140 through an interface such as a low voltage differential signaling (LVDS) interface and a transition minimized differential signaling (TMDS) interface. Further, the host system 150 supplies the timing signals and a mode signal MODE for distinguishing the 2D mode from the 3D mode to the image converter 140.

The image converter 140 does not convert the 2D image data RGB2D and outputs the 2D image data RGB2D to the timing controller 130 in the 2D mode. The image converter 140 generates left-eye image data RGBL and right-eye image data RGBR from the 2D image data RGB2D in the 3D mode. And then, the image converter 140 converts the left-eye data RGBL and the right-eye image data RGBR to the 3D image data RGB3D according to a 3D format. Therefore, the image converter 140 outputs the 3D image data RGB3D to the timing controller 130 in the 3D mode.

In the 3D mode, the image converter 140 extracts a depth map from the 2D image data RGB2D and calculates disparities based on depths in the depth map. And then, the image converter 140 calculates a gain disparity for each disparity by multiplying the each disparity by a gain value and generates left-eye image data RGBL and right-eye image data RGBR by shifting the 2D image data RGB2D according to the gain disparity. The image converter 140 converts the left-eye image data RGBL and the right-eye image data RGBR into the 3D image data RGB3D according to a 3D format such as the pattern retarder method, the shutter glass method or the non-glass method. The image converter 140 and an image conversion method according to the embodiment of the invention are described in detail below with reference to FIGS. 4 and 5.

Figure 4:
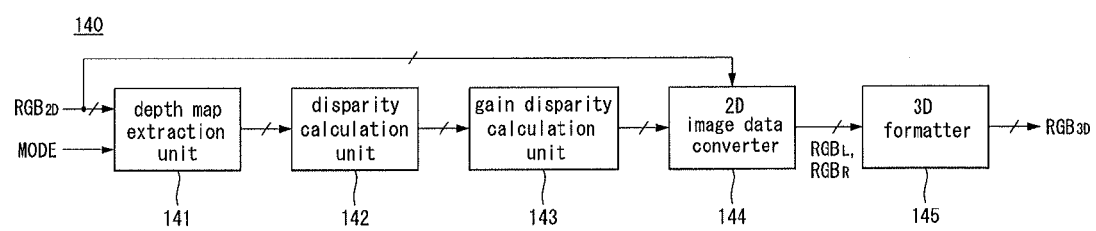
FIG. 4 is a block diagram of an image converter shown in FIG. 3.

FIG. 4 is a block diagram of the image converter shown in FIG. 3. FIG. 5 is a flow chart illustrating the image conversion method of the image converter. Referring to FIG. 4, the image converter 140 includes a depth map extractor 141, a disparity calculator 142, a gain disparity calculator 143, a 2D image data converter 144, and a 3D formatter 145. In the following description, image conversion method of the image converter 140 is specifically described.

Figure 6A:
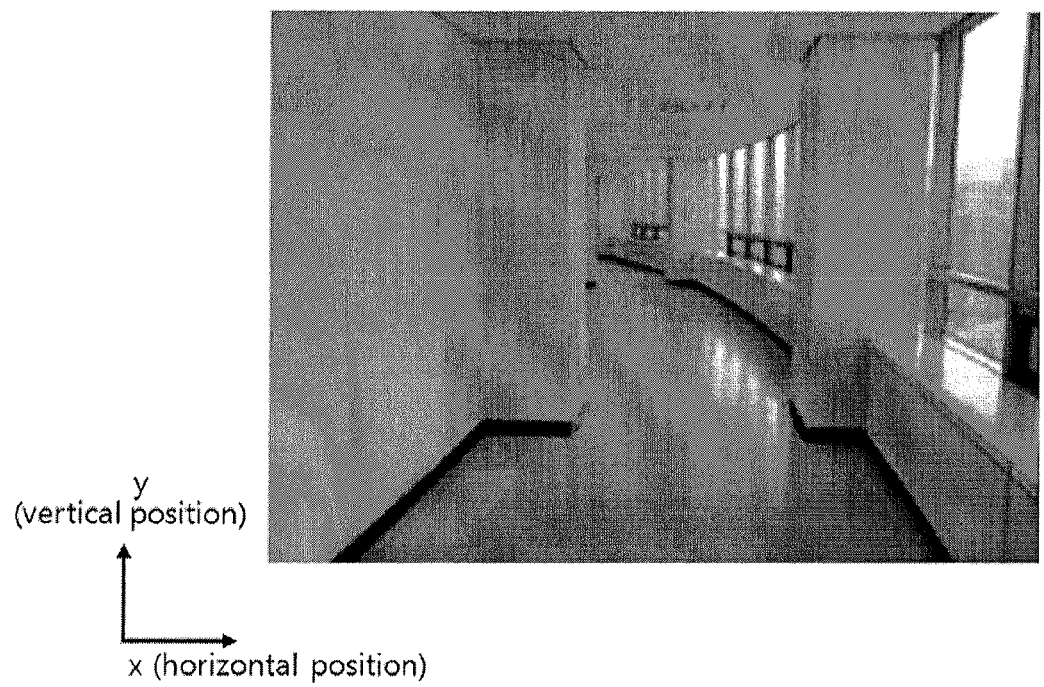
FIGS. 6A and 6B are a 2D image and a depth map image input to an image converter.
Figure 6B:
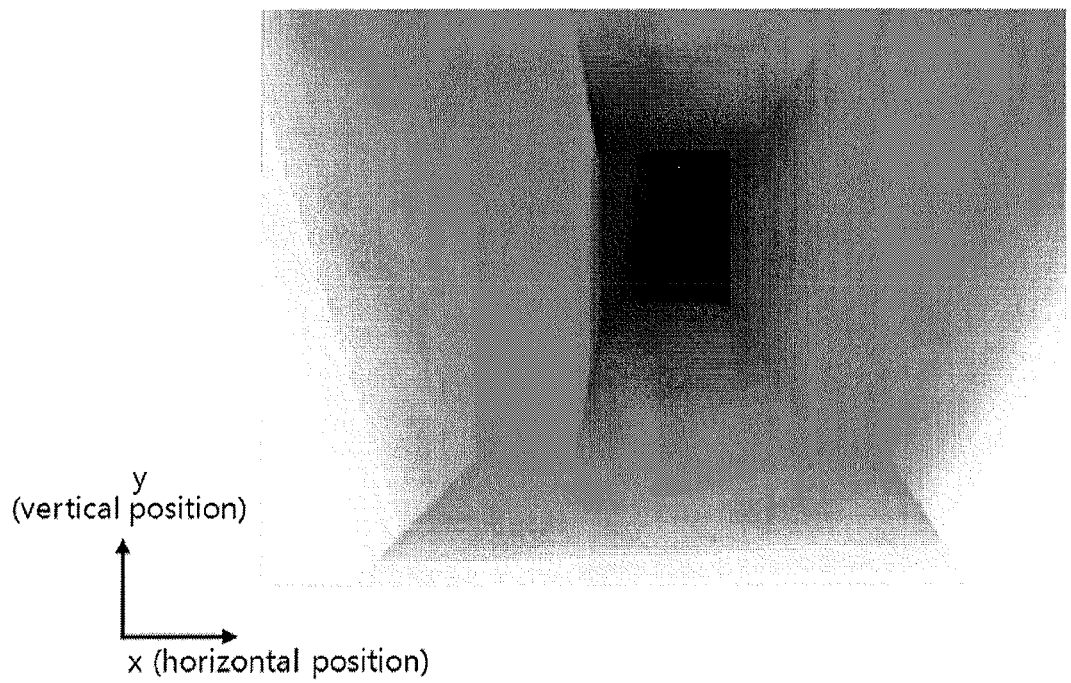

The depth map extractor 141 extracts a depth map from the 2D image data RGB2D input from the host system 150. The depth map includes a plurality of depth values corresponding to the 2D image data RGB2D of each pixel. A depth value is a reference value capable of determining a 3D effect of the 3D image. That is, the depth value means information capable of expressing the 3D effect of the 3D image. Each of the depth values is expressed as a Dep(x, y) in Cartesian coordinate system. Here, x is a natural number equal to or more than 1 and equal to or less than n, and n is a horizontal resolution of the display panel 10. Also, y is a natural number equal to or more than 1 and equal to or less than m, and m is a vertical resolution of the display panel 10. In FIGS. 6A and 6B, x means a horizontal position of the display panel 10 and y means a vertical position of the display panel 10. For example, if the resolution of the display panel 10 is 1920× 1080, the disparity calculator 142 calculates the depth values for all depth coordinates of the display panel 10 from Dep(1, 1) to Dep(1920, 1080). The depth map extractor 141 prepares a depth map including the depth values from Dep (1, 1) to Dep (n, m) and outputs the depth map to the disparity calculator 142.

FIG. 6A illustrates the 2D image of the 2D image data RGB2D input to the depth map extractor 141. FIG. 6B illustrates the depth map extracted from the depth map extractor 141. Referring to FIGS. 6A and 6B, the depth value can be represented as the gray level. When the 2D image data of 8 bits is input, the depth value is represented as the gray level '0' to '255'. The gray level '0' means a peak black and the gray level '255' means a peak white. As the depth value has a higher gray level, the 3D effect of the 3D image is deeper. Also, as the depth value has a lower gray level, the 3D effect of the 3D image is shallower.

The depth map extractor 141 finds an object through object detection techniques and extracts the depth values of the object by using various depth cues. The depth cues mean various kinds of methods capable of obtaining the depth values of the object. The depth cues include a reiteration analysis, a vanishing point analysis, a shadow analysis, a motion analysis, an outline analysis, relative size analysis, and so on. The reiteration analysis analyzes objects piled up and determines a depth value of a front object and a depth value of a rear object, respectively. The vanishing point analysis detects a vanishing point of an object and processes the vanishing point as a background depth value to create perspective. The shadow analysis determines a depth value according to darkness and brightness of an object. The motion analysis detects a motion of an object and determines a depth value of the object according to the relativity of the motion. The outline analysis determines a depth value of an object according to the outline of the object. The relative size analysis determines a depth value by comparing the size of each of the objects with each other. (S101)

The disparity calculator 142 calculates disparity values by using a convergence, a max disparity, and the depth map extracted from depth map extractor 141. A disparity value means a value for shifting 2D image data left or right. The 3D effect of the 3D images is controlled by the disparity. Each of the disparity values is expressed as a Dis(x, y) in Cartesian coordinate system. The convergence means a position on which a focus of the 3D images is formed. The focus of the 3D images may be formed at the front of the display panel 10 or the rear of the display panel 10 by controlling the convergence. The max disparity means a maximum value for shifting 2D image data RGB2D left or right.

Referring to equation 1, the disparity calculator 142 calculates a disparity value Dis(x, y) at coordinate (x, y) based on the depth value Dep(x, y) at coordinate (x, y), the convergence C, and the max disparity MD.

$$\mathrm{Dis}(x, y) = \frac{(\mathrm{Dep}(x, y) - C) \times MD}{256} \quad \text{[Equation 1]}$$

In equation 1, the depth value Dep(x, y) at coordinate (x, y) is represented as a gray level. The convergence C and the max disparity MD may be appropriately set. The disparity calculator 142 outputs the disparity values to the gain disparity calculator 143 after calculating the disparity values from Dis (1, 1) to (n, m). (S102)

The gain disparity calculator 143 calculates a gain disparity GD by multiplying the disparity value by a predetermined gain value G according to horizontal position of each of the pixels. The gain value G means a value for being multiplied by the disparity value. The gain disparity GD means a value calculated by multiplying the gain value G by the disparity Dis.

Figure 7:
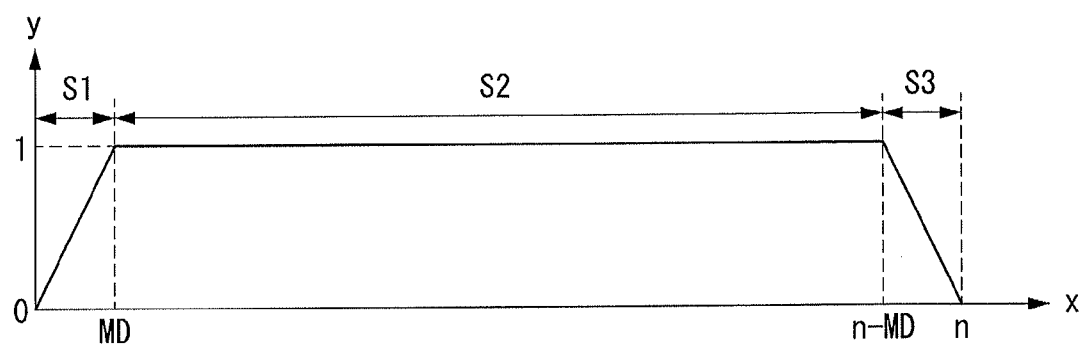
FIG. 7 is a graph illustrating a change of a gain value according to a horizontal position of each of pixels.

FIG. 7 is a graph illustrating a change of a gain value according to a horizontal position of each of pixels. In FIG. 7, x axis represents a horizontal position of a pixel and y axis represents a gain value G. Referring to FIG. 7, the gain value G increases linearly from '0' to '1' in a first section S1 where the coordinate x is from '0' to 'MD'. The gain value G maintains '1' in a second section S2 where the coordinate x is from 'MD' to 'n-MD'. The gain value G decreases linearly from '1' to '0' in a third section S3 where the coordinate x is from 'n-MD' to 'n'. That is, the first section S1 and the third section S3 depend on the max disparity MD. Also, the gain value G in the first section S1 and the third section S3 depends on the max disparity MD. Meanwhile, the gain disparity calculator 143 includes a lookup table storing the gain value G according to the coordinate x.

The gain disparity calculator 143 calculates a gain disparity GD(x, y) at coordinate (x, y) by multiplying a disparity value Dis(x, y) at coordinate (x, y) by a gain value G(x) at coordinate x. For example, the gain disparity calculator 143 calculates gain disparities at coordinate (1, 1) to (1, 1080) by multiplying disparity values at coordinate (1, 1) to (1, 1080) by a gain value G(1) at coordinate 1. The gain disparity calculator 143 calculates gain disparities at coordinate (MD, 1) to (MD, 1080) by multiplying disparity values at coordinate (MD, 1) to (MD, 1080) by the gain value G(MD) coordinate MD. The gain disparity calculator 143 outputs gain disparities to the 2D image data converter 144 after calculating the gain disparities at coordinate (1, 1) to (n, m). (S103)

The 2D image data converter 144 generates left-eye image data RGBL and right-eye image data RGBR by shifting the horizontal position of the 2D image data RGB2D according to the gain disparity GD. The 2D image data converter 144 shifts the horizontal position of the 2D image data by subtracting the gain disparity GD from the horizontal position of the 2D image data. And then, the 2D image data converter 144 generates the 2D image data of the shifted horizontal position as the left-eye image data. Also, the 2D image data converter 144 shifts the horizontal position of the 2D image data by adding the gain disparity GD to the horizontal position of the 2D image data. And then, the 2D image data converter 144 generates the 2D image data of the shifted horizontal position as the right-eye image data. In the following description, a method of generating the left-eye image data and the right-eye image data of the 2D image data converter 144 is specifically described.

Referring to equation 2, the 2D image data converter 144 replaces the coordinate x of 2D image data to difference between the coordinate x and a gain disparity GD(x, y) at coordinate (x, y). The 2D image data converter 144 applies 2D image data at coordinate (x−Disparity(x, y), y) as left-eye image data L(x, y) at coordinate (x, y). The 2D image data converter 144 replaces the coordinate x of 2D image data to sum coordinate x and a gain disparity GD(x, y) at coordinate (x, y). The 2D image data converter 144 applies 2D image data at coordinate (x+Disparity(x, y), y) as right-eye image data R(x, y) at coordinate (x, y).

$$L(x,y)=2D(x-Dis(x,y),y)$$

$$R(x,y)=2D(x+Dis(x,y),y) \quad [\text{Equation 2}]$$

In equation 2, L(x, y) means the left-eye image data coordinate (x, y), R(x, y) means the right-eye image data coordinate (x, y), 2D(x−Disparity(x, y), y) means the 2D image data coordinate (x−Disparity(x, y), y), and 2D(x+Disparity(x, y), y) means the 2D image data coordinate (x+Disparity(x, y), y). The 2D image data converter 144 outputs the left-eye image data RGBL to the 3D formatter 145 by generating the left-eye image data at coordinate (1, 1) to (n, m). Also, the 2D image data converter 144 outputs the right-eye image data RGBR to the 3D formatter 145 by generating the right-eye image data at coordinate (1, 1) to (n, m). (S104)

The 3D formatter 146 converts the left-eye image data RGBL and the right-eye image data RGBR into the 3D image data RGB3D according to a 3D format of the stereoscopic image display method such as the pattern retarder method, the shutter glass method or the non-glass method. In case of the shutter glass method, the 3D formatter 145 generates the 3D image data RGB3D by arranging the left-eye image data RGBL and the right-eye image data RGBR sequentially every p frame period, wherein p is a natural number. In case of the pattern retarder method, the 3D formatter 145 generates the 3D image data RGB3D by arranging the left-eye image data RGBL and the right-eye image data RGBR sequentially every q line(s) in a frame period, wherein q is a natural number.

As described above, the stereoscopic image display device according to the embodiment of the invention calculates a gain disparity by applying a gain value to a disparity and generates left-eye image data and right-eye image data from 2D image data, and converts the left-eye image data and the right-eye image data into 3D image data according to 3D format. Especially the gain value has a value from '0' to '1' in the first section and the third section, which corresponds to both sides of the left-eye image data and the right-eye image data. As a result, the stereoscopic image display device according to the embodiment of the invention prevents both sides of the left-eye image data and the right-eye image data from losing data when the left-eye image data and the right-eye image data are generated. Therefore, the stereoscopic image display device according to the embodiment of the invention can prevent images distortion in both sides of 3D images.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A stereoscopic image display device comprising:
   a display panel including data lines, scan lines, and a plurality of pixels formed in cell areas;
   an image converter that calculates disparity values based on depth values of the depth map extracting from 2D image data, calculates gain disparities by multiplying each of the disparity values by a predetermined gain value, generates left-eye image data and right-eye image data by shifting the 2D image data according to each of the gain disparities, and converts the left-eye image data and the right-eye image data into the 3D image data according to a 3D format;
   a data driver that converts the 3D image data to data voltage and supplies data voltage to the data lines; and
   a gate driver that sequentially supplies gate pulses synchronized with the data voltage to the gate lines,
   wherein the image converter comprises:
   a depth map extractor that extracts the depth map from the 2D image data;
   a disparity calculator that calculates the disparity values based on a convergence, a max disparity, and the depth values in the depth map;
   a gain disparity calculator that calculates the gain disparities by multiplying each of the disparity values by the predetermined gain value according to a horizontal position of each of the pixels; and
   a 2D image data converter that generates left-eye image data and right-eye image data by changing the horizontal position of the 2D image data according to each of the gain disparities, and
   wherein the predetermined gain value increases linearly from 0 to 1 in a first section where the horizontal position of the pixel is from 0 to a max disparity, maintains 1 in a second section where the horizontal position of the pixel is from the max disparity to a n-max disparity, decreases linearly from 1 to 0 in a third section where the horizontal position of the pixel is from the n-max disparity to n, and n is a natural number and the horizontal resolution of the display panel.

2. The stereoscopic image display device of claim 1, wherein the gain disparity calculator includes a lookup table to store the predetermined gain value.

3. The stereoscopic image display device of claim 1, wherein the 2D image data converter shifts the horizontal position of the 2D image data by subtracting the gain disparity from the horizontal position of the 2D image data and then generates the 2D image data of the shifted horizontal position as the left-eye image data.

4. The stereoscopic image display device of claim 1, wherein the 2D image data converter shifts the horizontal position of the 2D image data by adding the gain disparity to the horizontal position of the 2D image data and then generates the 2D image data of the shifted horizontal position as the right-eye image data.

5. The stereoscopic image display device of claim 1, wherein the image converter includes 3D formatter that converts the left-eye image data and the right-eye image data into the 3D image data.

6. A method for driving a stereoscopic image display device including a display panel including data lines, scan lines, and a plurality of pixels formed in cell areas comprising:
(a) extracting a depth map from 2D image data, calculating disparity values based on depth values of the depth map, calculating gain disparities by multiplying each of the disparity values by a predetermined gain value, generating left-eye image data and right-eye image data by shifting the 2D image data according to each of the gain disparities, and converting the left-eye image data and the right-eye image data into the 3D image data according to a 3D format;
(b) converting the 3D image data to the data voltage and supplying data voltage to the data lines; and
(c) sequentially supplying gate pulses synchronized with the data voltage to the gate lines,
the step (a) comprises:
extracting the depth map from the 2D image data;
calculating the disparity values based on a convergence, a max disparity, and the depth values in the depth map;
calculating the gain disparities by multiplying each of the disparity values by the predetermined gain value according to a horizontal position of each of the pixels; and
generating left-eye image data and right-eye image data by changing the horizontal position of the 2D image data according to each of the gain disparities, and wherein the predetermined gain value increases linearly from '0' to '1' in a first section where the horizontal position of the pixel is from '0' to the 'max disparity', maintains '1' in a second section where the horizontal position of the pixel is from the 'max disparity' to the 'n-max disparity', decreases linearly from '1' to '0' in a third section where the horizontal position of the pixel is from the 'n-max disparity' to 'n', and n is a natural number and the horizontal resolution of the display panel.

7. The method for driving the stereoscopic image display device of claim 6, wherein generating left-eye image data and right-eye image data by changing the horizontal position of the 2D image data according to each of the gain disparities includes,
shifting the horizontal position of the 2D image data by subtracting the gain disparity from the horizontal position of the 2D image data; and
generating the 2D image data of the shifted horizontal position as the left-eye image data.

8. The method for driving the stereoscopic image display device of claim 6, wherein generating left-eye image data and right-eye image data by changing the horizontal position of the 2D image data according to each of the gain disparities includes,
shifting the horizontal position of the 2D image data by adding the gain disparity to the horizontal position of the 2D image data; and
generating the 2D image data of the shifted horizontal position as the right-eye image data.

* * * * *